US011421559B1

(12) United States Patent
Hussain (10) Patent No.: US 11,421,559 B1
(45) Date of Patent: Aug. 23, 2022

(54) METHOD OF HYBRID POWER GENERATION IN AN ENVIRONMENT WITH A GAS PRESSURE BELOW THE EARTH'S ATMOSPHERIC PRESSURE

(71) Applicant: MAREEKH DESIGN PTY LTD., Smithfield (AU)

(72) Inventor: Muhammad Akbar Hussain, Smithfield (AU)

(73) Assignee: MAREEKH DESIGN PTY LTD., Smithfield (AU)

( * ) Notice: Subject to any disclaimer, the term of this patent is extended or adjusted under 35 U.S.C. 154(b) by 0 days.

(21) Appl. No.: 17/695,674

(22) Filed: Mar. 15, 2022

Related U.S. Application Data (63) Continuation-in-part of application No. 29/781,163, filed on Apr. 28, 2021.
(Continued)

(51) Int. Cl.
  *F01K 7/32* (2006.01)
  *F01K 11/02* (2006.01)
  (Continued)

(52) U.S. Cl.
  CPC ............... *F01K 7/32* (2013.01); *F01K 11/02* (2013.01); *F01K 21/005* (2013.01); *B64G 9/00* (2013.01)

(58) Field of Classification Search
  CPC ..... B64G 9/00; F01K 7/32; F01K 7/10; F01K 7/12; F01K 7/14; F01K 7/16; F01K 7/165; F01K 11/00; F01K 11/02; F01K 13/00; F01K 13/006; F01K 13/02; F01K 15/00; F01K 21/00; F01K 21/005; F01K 21/04; F01K 21/042; F01K 21/045; F01K 25/00; F01K 25/06; F01K 25/103; F01K 27/00

See application file for complete search history.

(56) References Cited

U.S. PATENT DOCUMENTS 2,802,114 A * 8/1957 Artsay ..................... F01K 17/02
  60/646
6,439,508 B1   8/2002 Taylor
(Continued)

FOREIGN PATENT DOCUMENTS

CA        2830318 A1 *  9/2012  ............. F01K 17/04
CN      109185083 A  *  1/2019  ............. F01D 15/10
(Continued)

*Primary Examiner* — Mark A Laurenzi
*Assistant Examiner* — Xiaoting Hu (57) ABSTRACT

In a method of hybrid power generation in an environment with a gas pressure below the earth's atmospheric pressure, liquid water is extracted from a subsurface water ice deposit by pumping superheated-supercritical fluid heated by a heater through an extraction well into the subsurface water ice deposit in order to form a liquid water reservoir. Liquid water is pumped from the liquid water reservoir through the extraction well to the buffer tank. The liquid water is pumped from the buffer tank into a high pressure feeder system (HPFS) and a low pressure feeder system (LPFS), which are each also heated by the heater. The HPFS outputs supercritical water and the LPFS outputs flash steam into a combined injector and the mixture is injected into a turbine at near environmental pressure. This mixture explosively expands into superheated steam and passes through the turbine, powering an electrical generator.

13 Claims, 6 Drawing Sheets

Related U.S. Application Data

(60) Provisional application No. 63/161,035, filed on Mar. 15, 2021.

(51) Int. Cl.
*F01K 21/00* (2006.01)
*B64G 99/00* (2009.01)

(56) References Cited

U.S. PATENT DOCUMENTS

| | | | |
|---|---|---|---|
| 7,469,864 B2 | 12/2008 | Bigelow | |
| 7,874,162 B2 * | 1/2011 | Tomlinson | F01K 23/106 |
| | | | 122/7 B |
| 8,070,105 B2 | 12/2011 | Johnson | |
| 8,474,760 B2 | 7/2013 | Leventhal | |
| 9,816,400 B1 * | 11/2017 | Phelps, Sr. | B01D 5/0027 |
| 9,970,208 B2 | 5/2018 | Irons | |
| 2004/0148941 A1 * | 8/2004 | Wylie | F02C 6/18 |
| | | | 60/39.182 |
| 2011/0271676 A1 * | 11/2011 | Walpita | F01K 7/32 |
| | | | 60/645 |
| 2018/0119577 A1 * | 5/2018 | Zhang | F01K 23/10 |
| 2019/0170025 A1 * | 6/2019 | Phelps, Sr. | F01K 9/003 |

FOREIGN PATENT DOCUMENTS

| | | | | |
|---|---|---|---|---|
| CN | 111022137 B | * | 3/2021 | F01K 13/00 |
| JP | 06042703 A | * | 2/1994 | F01K 23/106 |
| TW | M527042 U | * | 8/2016 | F01K 23/106 |
| WO | WO-2014072068 A1 | * | 5/2014 | F01K 25/065 |

* cited by examiner

METHOD OF HYBRID POWER GENERATION IN AN ENVIRONMENT WITH A GAS PRESSURE BELOW THE EARTH'S ATMOSPHERIC PRESSURE

The current application claims a priority to the U.S. Provisional Patent application Ser. No. 63/161,035 filed on Mar. 15, 2021.

FIELD OF THE INVENTION

The present invention relates generally to power generation. More particularly, the present invention relates to power generation in extraterrestrial environments to support human habitation.

BACKGROUND OF THE INVENTION

For nearly all of its history, humanity has been bound to a single planet, Earth. In relatively recent times, however, humans have begun to venture off the planet to explore what's beyond the safety and comfort of Earth's atmosphere in the name of exploration, science, and business. Aside from landing on Earth's moon, however, manned missions to other extraterrestrial objects have not yet taken place. Various unmanned missions to Mars have been executed, to varying degrees of success, and the idea of sending humans to Mars has been the subject of aerospace engineering and scientific studies since the 1940s, addition to a plethora of fictional works since the late 1800s.

Various organizations have proposed plans for a human mission to Mars, the first step towards any colonization effort, but humans have yet to step foot on the Martian surface. However, landers and rovers have successfully explored the planetary surface and delivered information about conditions on the ground.

Potential motivating factors for colonizing Mars include curiosity, the potential for humans to provide more in-depth observational research than unmanned rovers, economic interest in its resources, and the possibility that the settlement of other planets could decrease the likelihood of human extinction. Difficulties and hazards include radiation exposure during a trip to Mars and on its surface, toxic soil, low gravity, the isolation that accompanies Mars' distance from Earth, a lack of readily available water, and cold temperatures. Conditions on the surface of Mars are closer to the conditions on Earth in terms of temperature and sunlight than on any other planet or moon, except for the cloud tops of Venus. However, the surface is not hospitable to humans or most known life forms due to the radiation, greatly reduced air pressure, and an atmosphere consisting mostly of carbon dioxide ($CO_2$) with only 0.16% oxygen.

Since the natural Mars surface presents a hostile environment for human habitation, human survival on Mars would require living in artificial Mars habitats with complex life-support systems. Such habitats, of course, would require a sufficient source of electrical power.

When there are humans on Mars for long-term stay or colonization, a reliable power source will be essential. Solar power, or the use of nuclear reactors such as Radioisotope Thermoelectric Generators (RTGs) or their modified forms like NASA Kilopower concept, or use of Small Modular Reactors (SMR) have been extensively discussed in the literature, but natural resources on Mars for power generation are very limited. This includes low solar flux for solar power generation due to the greater distance of Mars from the Sun as compared to that of the Earth's. Wind power is extremely limited on Mars too due to its very thin atmosphere which is incapable of generating any useful force to run wind turbines. As there are no open water bodies on the surface of Mars, generating tidal power is out of the question. Also, there are no known geothermal sources of power on Mars, and due to much weaker geological activity as compared to Earth, there is little future prospect of finding any. Furthermore, Mars does not have any known 'fossil-fuel' or hydrocarbon reserves or reserves of radioactive minerals on the surface of Mars. While robotic missions have done well with solar power or Radioisotope Thermoelectric Generators (RTGs) on the surface of Mars, powering a permanent human presence on Mars is a different story. Mars is distant and the logistics of transport from Earth to Mars are complicated, challenging and potentially dangerous. While carrying conventional fuel from Earth to Mars is not practical, carrying nuclear fuel to Mars poses a logistical nightmare as well due to the risks involved in launching a payload from the surface of Earth destined to Mars, except in limited quantities such as for RTGs or Small Modular Reactors (SMRs).

Though Mars appears dry with no liquid water on or near its surface, below the Martian surface, at depths ranging from a few meters to several kilometers below the surface, covering vast swathes of land, are substantial reservoirs of water ice in the form of permafrost and sub-surface glaciers. The present invention aims to utilize this water ice to help boost the efficiency of the known power generation methods in the unique proposed Hybrid power-generation technology specifically designed to work in a Martian environment or other applicable environments.

It is therefore an objective of the present invention to provide a hybrid power generation method that combines an auxiliary power source such as solar power or limited nuclear power from imported small reactors from Earth with available local resources on Mars to generate considerable amounts of power in an extremely efficient manner utilizing unique attributes of the Martian environment or other suitable environment. The hybrid power generation method is simple, cost effective, environment friendly, and can be constructed using available technology with minimal expertise.

Additional advantages of the invention will be set forth in part in the description which follows, and in part will be obvious from the description, or may be learned by practice of the invention. Additional advantages of the invention may be realized and attained by means of the instrumentalities and combinations particularly pointed out in the detailed description of the invention section. Further benefits and advantages of the embodiments of the invention will become apparent from consideration of the following detailed description given with reference to the accompanying drawings, which specify and show preferred embodiments of the present invention.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising", when used herein, specify the presence of stated features, steps, operations, elements, various embodiments, and/or components, but do not preclude the presence or addition of one or more other features, steps, operations, elements, various embodiments, components, and/or groups thereof.

Unless otherwise defined, all terms (including technical and scientific terms) used herein have the same meaning as commonly understood by one having ordinary skill in the art to which this invention belongs. It will be further understood that terms, such as those used in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques, embodiments and/or steps are disclosed. Each of these has individual benefit and each can also be used in conjunction with one or more, or in some cases all, of the other disclosed techniques, embodiments and/or steps. Accordingly, for the sake of clarity, the present disclosure will refrain from repeating every possible combination of the individual steps, techniques or embodiments in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident however, to one skilled in the art, that the present invention may be practiced with or without these details or with other similar or otherwise suitable details.

The present disclosure is to be considered as an exemplification of the invention, and it is not intended to limit the invention to the specific embodiments illustrated by the figures or descriptions.

The present invention is a method of hybrid power generation in an environment with a gas pressure below the earth's atmospheric pressure or any other applicable environment, and may be referred to in some instances as the "Mareekh Process." The present invention utilizes an auxiliary power source, such as solar panels or limited nuclear power using RTGs or modified SMRs, to melt permafrost or subsurface glaciers on Mars or in other applicable environments and extract the melted water under pressure to user for power generation. It should be noted that while the present invention is primarily designed and intended for use on Mars, the present invention may be used in any environment with a gas pressure suitably below the earth's atmosphere, and references to Mars through should be understood to implicitly include this generality. The liquid water at high temperature and pressure, once extracted and exposed to the very low atmospheric pressure on Mars, will explosively evaporate and expand, generating sufficient power to run steam turbines for electricity generation. This extracted water can also be utilized for human consumption, farming and agriculture, manufacturing and construction, and mining.

Figure 1:
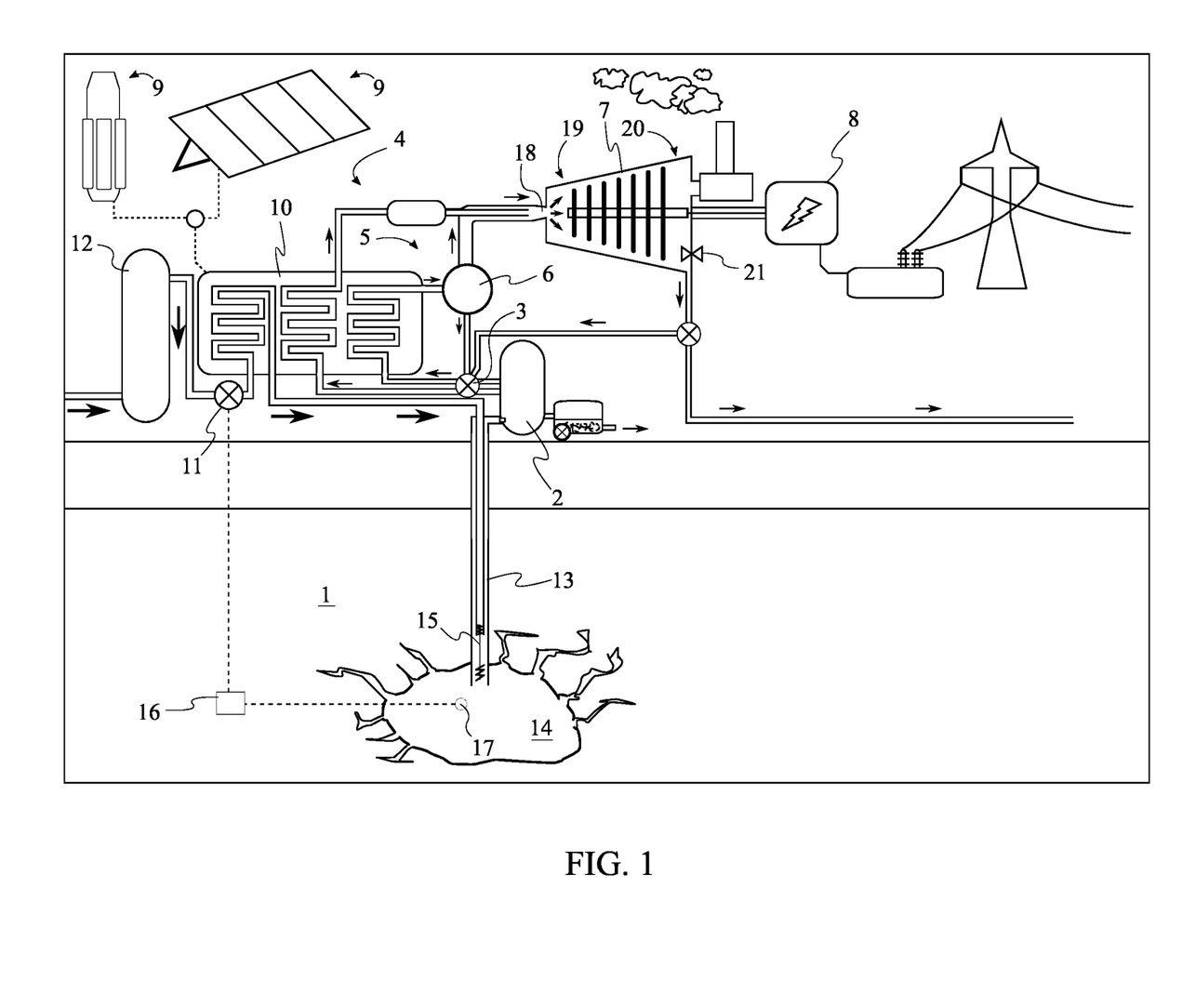
FIG. 1 is a schematic diagram of the components used in the present invention.
Figure 2:
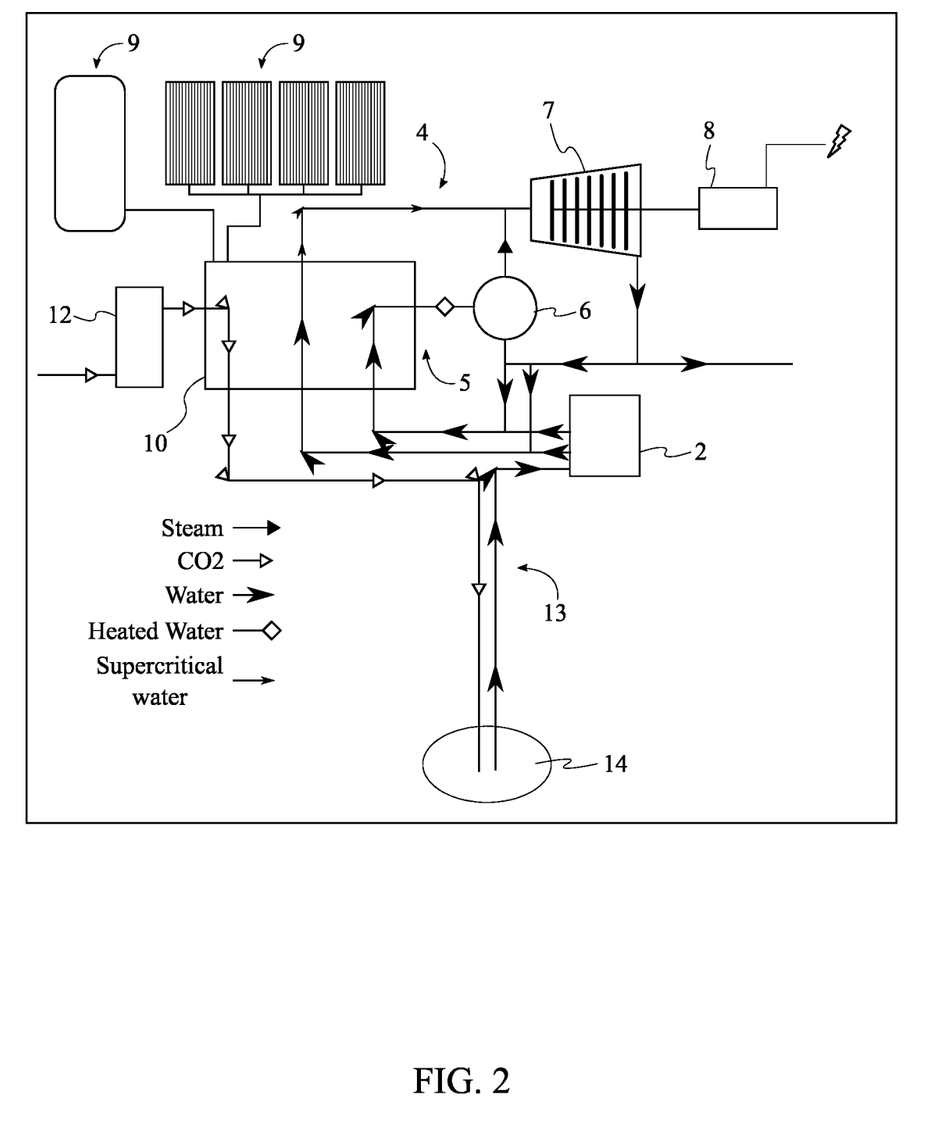
FIG. 2 is a simplified schematic diagram showing various fluid flow states in the present invention.
Figure 3:
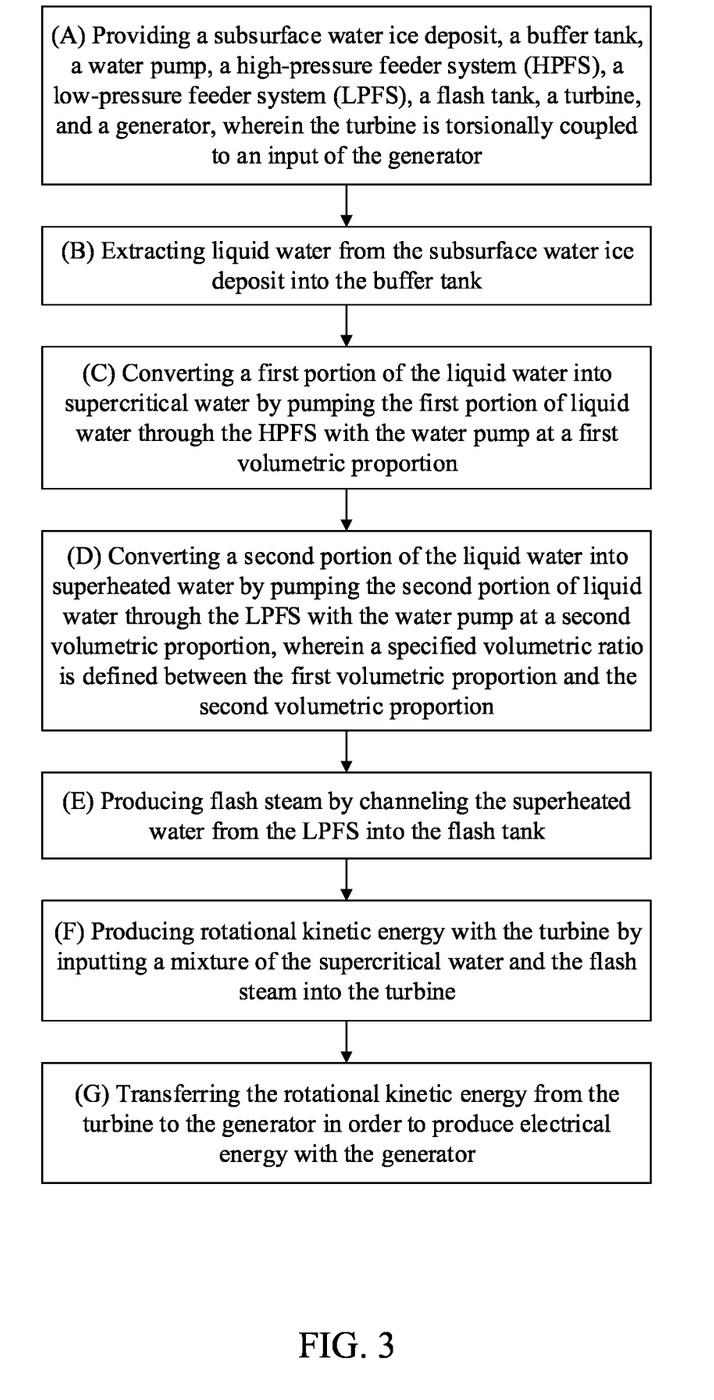
FIG. 3 is a stepwise flow diagram of the general method of the present invention.

Referring to FIGS. 1-3, in the general method of the present invention, a subsurface water ice deposit 1 is provided (step (A)), which corresponds to the aforementioned permafrost or subsurface glaciers. A buffer tank 2 is further provided, as well as a water pump 3, a high-pressure feeder system (HPFS 4), a low-pressure feeder system (LPFS 5), a flash tank 6, a turbine 7, and a generator 8, wherein the turbine 7 is torsionally coupled to an input of the generator 8.

To begin the power generation process, liquid water is extracted from the subsurface water ice deposit 1 into the buffer tank 2 (step (B)). A first portion of the liquid water is converted into supercritical water by pumping the first portion of liquid through the HPFS 4 with the water pump 3 at a first volumetric proportion (step (C)). A second portion of the liquid water is converted into superheated water by pumping the second portion of liquid through the LPFS 5 with the water pump 3 at a second volumetric proportion (step (D)), wherein a specified volumetric ratio is defined between the first volumetric proportion and the second volumetric proportion. It should be noted that although steps (C) and (D) are listed sequentially in the disclosure herein, they occur simultaneously and continuously. Moreover, in general, the method of the present invention disclosed herein may be understood to be a generally continuous and simultaneous process in the preferred embodiment of the present invention without any steps necessarily consisting of discrete iterations, repetitions, or the like.

In step (E), flash steam is produced by channeling the superheated water from the LPFS 5 into the flash tank 6. With the supercritical water having been produced through the HPFS 4 and the flash steam having been produced through the LPFS 5, the supercritical water and the flash steam are inputted into the turbine 7 in order to produce rotational kinetic energy with the turbine 7 (step (F)). More particularly, the supercritical water and the flash steam are inputted into the turbine 7 through a combined injector 18. This mixture of supercritical water and flash steam explosively converts into superheated steam upon entry into the turbine 7 housing in order to produce the rotational kinetic energy with the turbine 7.

By mixing the supercritical water and the flash steam in the combined injector 18, the flash steam is made more efficient in driving the turbine 7. When the mixture is injected into the turbine 7, the mixture explosively expands into superheated steam. During this process, the supercritical water transfers much of its thermal energy to the flash steam, resulting in complete conversion of the mixture into superheated steam.

Finally, the rotational kinetic energy is transferred from the turbine 7 to the generator 8 in order to produce electrical energy with the generator 8 (step (G)).

Figure 4:
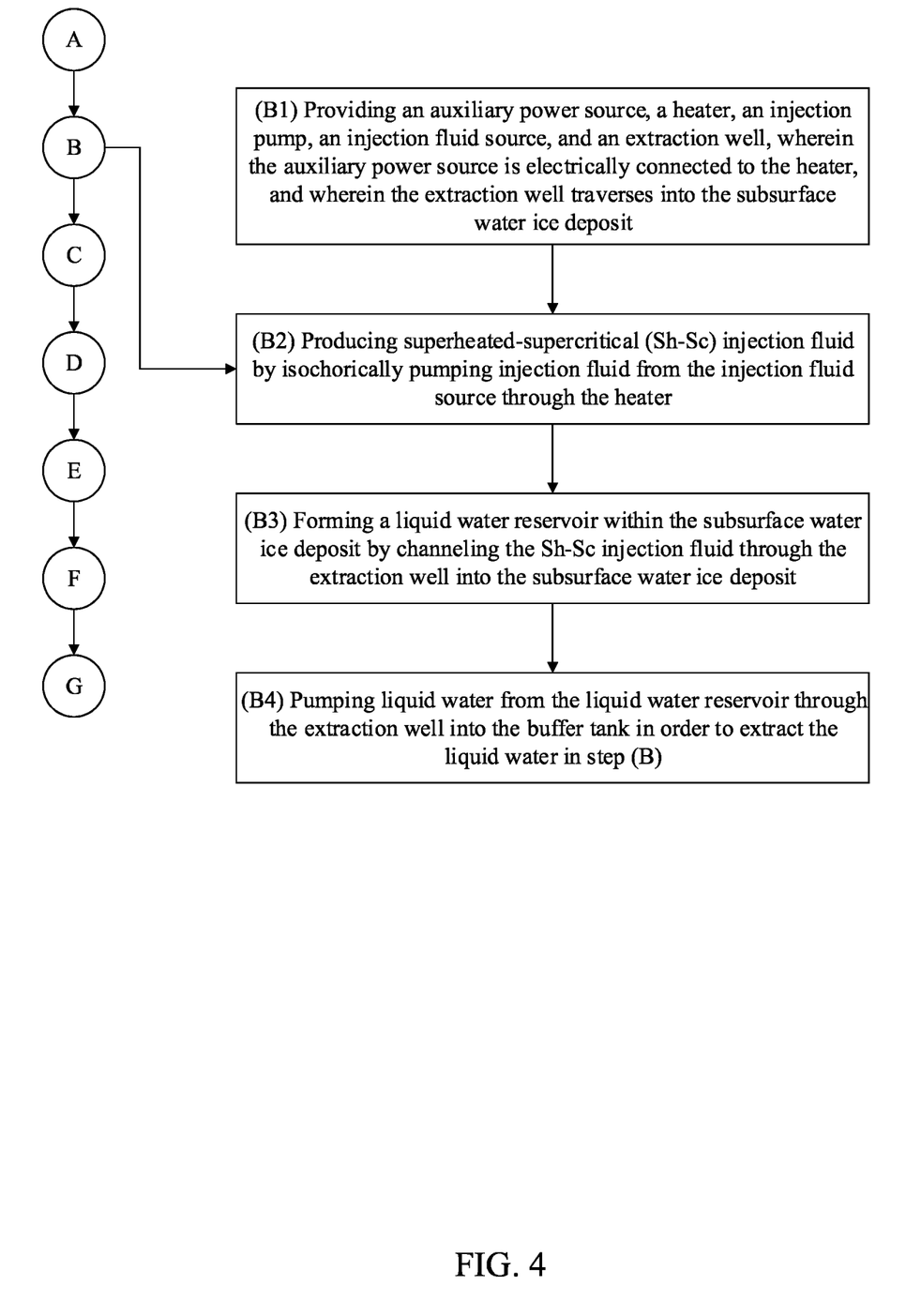
FIG. 4 is a stepwise flow diagram showing steps for extracting liquid water in the method of the present invention.

Further, referring to FIGS. 1 and 4, in the preferred embodiment of the present invention, an auxiliary power source 9 is provided, in addition to a heater 10, an injection pump 11, an injection fluid source 12, and an extraction well 13, wherein the auxiliary power source 9 is electrically connected to the heater 10, and wherein the extraction well 13 traverses into the subsurface water ice deposit 1. In the preferred embodiment, the heater 10 is an enclosed filament radiant-heater 10, though any other appropriate type of heater 10 or combination of heaters may be utilized in the present invention.

Figure 5:
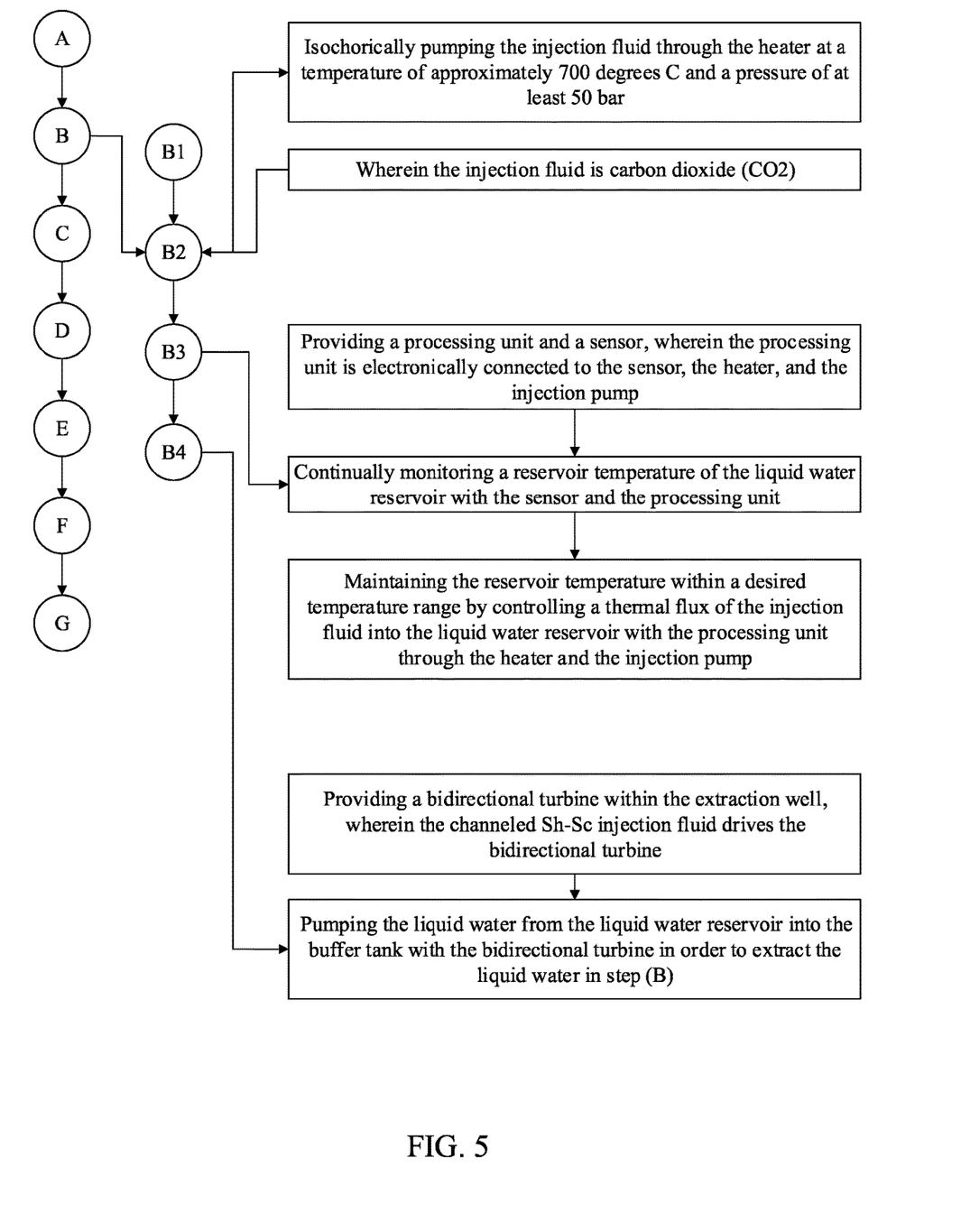
FIG. 5 is a stepwise flow diagram showing steps for extracting liquid water in the method of the present invention.

Referring to FIG. 5, to begin the process of extracting the liquid water in step (B), injection fluid is isochorically pumped from the injection fluid source 12 through the heater 10 in order to produce superheated-supercritical (Sh-Sc) injection fluid, wherein the heater 10 transfers thermal energy to the injection fluid in order to produce the Sh-Sc injection fluid. In the preferred embodiment, the injection fluid is CO2, since CO2 is readily available from the Martian atmosphere and is a favorable heat transfer medium. However, it is contemplated that in other embodiments, other suitable substances may be used as the injection fluid as suitable for various situations. The heater 10 acts as a heating chamber for liquified CO2 under pressure in an isochoric process to form superheated-supercritical Sh-Sc CO2 as the Sh-Sc injection fluid. The Sh-Sc injection fluid is channeled through the extraction well 13 into the subsurface water ice deposit 1. The heat of the Sh-Sc injection fluid melts a portion of the water ice deposit, forming a liquid water reservoir 14 within the subsurface water ice deposit 1.

Preferably, in the preferred embodiment, the liquid water reservoir 14 is formed and maintained within a desired temperature range of approximately 30 to 50 degrees Celsius and may be under tens of bars of pressure depending on the injection depth. The liquid water is then pumped from the liquid water reservoir 14 through the extraction well 13 into the buffer tank 2 in order to extract the liquid water in step (B).

Figure 6:
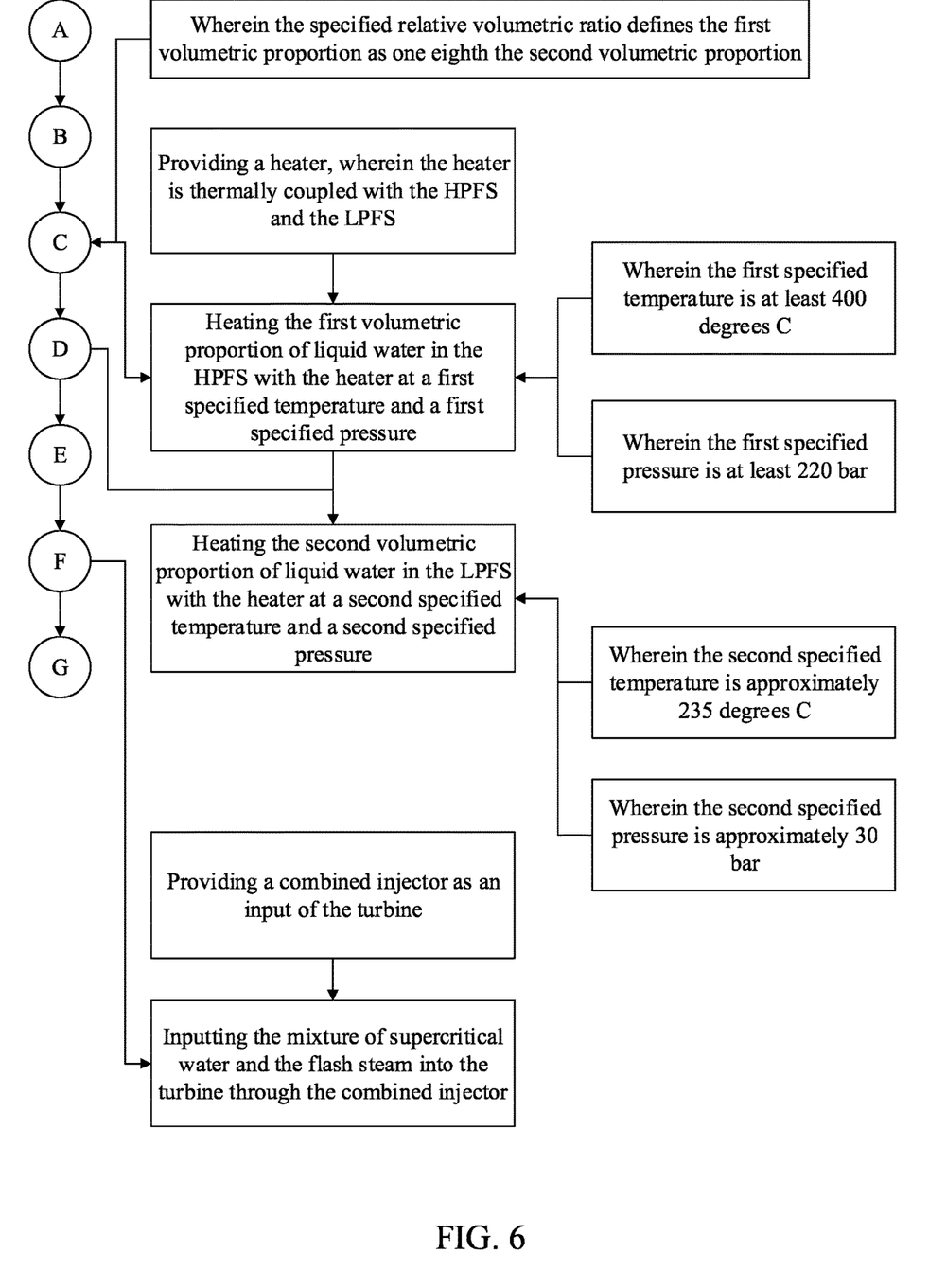
FIG. 6 is a stepwise flow diagram showing steps for producing and using supercritical water and flash steam in the method of the present invention.

In the preferred embodiment, referring to FIG. 6, the injection fluid is isochorically pumped through the heater 10 at a specified injection temperature and a specified injection pressure. Further, in the preferred embodiment, the specified injection temperature is approximately 700 degrees C., and the specified injection pressure is at least 50 bar. However, the specified injection temperature and the specified injection pressure should not be considered to be limited to these values, and the specified injection temperature and the specified injection pressure may vary as deemed appropriate in various embodiments and/or circumstances.

In the preferred embodiment, a bidirectional turbine 15 is further provided within the extraction well 13. The channeled Sh-Sc injection fluid drives the bidirectional turbine 15 as the Sh-Sc injection fluid passes through the bidirectional turbine 15 on its path down the extraction well 13 toward the subsurface water ice deposit 1, such that the liquid water is pumped from the liquid water reservoir 14 into the buffer tank 2 with the bidirectional turbine 15 in order to extract the liquid water in step (B).

To this end, a processing unit 16 and a sensor 17 are further provided in the preferred embodiment, wherein the processing unit 16 is electronically connected to the sensor 17, the heater 10, and the injection pump 11. To be clear, in general, one or more processing units may be provided in the present invention and may be operatively connected within the system wherever computer control is desired. Moreover, the sensor 17 is a temperature sensor 17 in the preferred embodiment, though any type of sensor 17 suitable for enabling temperature control of the liquid water reservoir 14 may be utilized in various embodiments as appropriate. A reservoir temperature of the liquid water reservoir 14 is continually monitored with the sensor 17 and the processing unit 16. This monitoring enables the processing unit 16 to maintain the reservoir temperature within a desired temperature range by controlling a thermal flux of the injection fluid into the liquid water reservoir 14 with the processing unit 16 through the heater 10 and the injection pump 11; more specifically, by modulating the temperature of the Sh-Sc injection fluid with the heater 10 and by modulating a flow rate of the Sh-Sc injection fluid with the injection pump 11.

Further, in the preferred embodiment of the present invention, the heater 10 is thermally coupled with the HPFS 4 and the LPFS 5. The first volumetric proportion of liquid water is heated in the HPFS 4 with the heater 10 at a first specified temperature and a first specified pressure. In the HPFS 4, the first volumetric proportion of liquid water is pumped from the buffer tank 2 into a series of tubes specially designed to withstand high temperatures and pressures, which runs through the heater 10 being powered by the auxiliary power source 9 of either solar or nuclear power, or another suitable auxiliary power source. In the preferred embodiment of the present invention, the first specified temperature is at least 400 degrees C., and the first specified pressure is at least 220 bar.

In the LPFS 5, the second volumetric proportion of liquid water is pumped from the buffer tank 2 into a series of tubes running through the heater 10, such that the second volumetric proportion of liquid water is heated with the heater 10 at a second specified temperature and a second specified pressure to form superheated water from the second volumetric proportion of liquid water. In the preferred embodiment, the second specified temperature is approximately 235 degrees C., and the second specified pressure is approximately 30 bar. This high pressure is maintained in order to avoid premature conversion of the superheated water into steam. Further, although the disclosure herein has generally described the LPFS 5 as preceding the flash tank 6 in the overall directional flow of the present invention, it may be understood that in some embodiments, the flash tank 6 is a constituent part of the LPFS 5, and/or the LPFS 5 may be understood to continue after the flash tank 6 to the turbine 7. In some embodiments, the HPFS 4 and the LPFS 5 may each be defined as terminating at an input of the turbine 7, though this definition should not necessarily be considered limiting to the present invention and any suitable arrangement of the aforementioned components may be utilized.

It should further be understood that the present invention should not be limited to the previously defined temperature and pressure parameters for the HPFS 4 and the LPFS 5, and any other suitable temperature and pressure parameters may be implemented in various embodiments and/or circumstances as appropriate.

Preferably, the flash tank 6 is maintained at a pressure of approximately 0.6 bar, though this value may vary in different embodiments so long as the flash tank 6 is kept at a substantially lower pressure than the LPFS 5. Due to this pressure difference, when the superheated water is released into the flash tank 6, approximately a quarter of the volume of the superheated water will instantaneously flash into steam, while the remaining three quarters of the volume of superheated water will turn into hot residual liquid water. This residual water is recovered and may be channeled back to the heater 10 for reuse in heating the LPFS 5.

Further, in the preferred embodiment, a combined injector 18 is provided as an input of the turbine 7, such that the supercritical water and the flash steam are inputted into the turbine 7 through the combined injector 18. Further, in the preferred embodiment, the turbine 7 is provided with a high pressure turbine housing 19 and a low pressure turbine housing 20. The high pressure turbine housing 19 may be understood, but not necessarily limited to, a proximal portion of the turbine 7 adjacent to the input of the turbine 7 adjacent to the input of the mixture at high pressure, while the low pressure turbine housing 20 corresponds to a distal portion of the turbine 7 at an area of lower pressure. In the preferred embodiment, in the combined injector 18, the supercritical water from HPFS 4 and the flash steam from LPFS 5 are mixed and injected into the high pressure turbine housing 19 at approximately 0.5 Bar, though this value may vary in different embodiments as appropriate. The mixture of supercritical water and flash steam instantaneously and completely converts into superheated steam, undergoing explosive expansion and thus transferring energy to the turbine 7 as the expanding steam moves towards the low pressure turbine housing 20 where a pressure of 0.01 bar is maintained using a pressure control valve. The pressure control valve opens directly to the exterior into the Martian atmosphere. In order to ensure condensation of the spent steam into water and prevent the water from freezing, a temperature of nearly 7 degrees C. is maintained inside the low pressure turbine housing 20 through insulation, the pressure control valve, and the steam inflow. To this end, a turbine sensor measuring a turbine temperature within the turbine 7 may be used in conjunction with the aforementioned processing unit 16 or a separate processing unit 16, which may further control the pressure control valve and/or a flow rate into the turbine 7 through the combined injector 18 in order to maintain the desired temperature within the turbine 7. A fraction of the steam from the low pressure turbine housing 20 is lost to the exterior environment through the pressure control valve and escapes as ice-vapor clouds. This loss of water as vapor cloud is replenished through the liquid reservoir and extraction well 13 to maintain a constant amount of warm water under pressure in the buffer tank 2.

As the injected water mixture makes its way through the turbine 7, kinetic energy produced by the mixture's explosive expansion into superheated steam is transferred to the turbine 7 in order to produce the rotational kinetic energy in step (F). As previously described, the rotational kinetic energy is then transferred from the turbine 7 to the generator 8 in order to produce electrical energy with the generator 8. The generated electricity may then be distributed to a human habitat through a power grid in a conventional manner, or to any other desired destination.

The primary difference between power generation using steam turbines on Earth and on Mars is the need to use surface condensers on Earth to maintain low pressures inside the steam turbine housing to produce maximum efficiency from the turbine. Surface condensers consume a fraction of power from the generator itself. Atmospheric pressure on Mars is very low as compared to that on Earth. Therefore, a surface condenser won't be required on Mars to maintain low pressure inside a steam turbine housing. Instead, in the present invention, this is accomplished simply through the pressure control valve. The lack of the need of a surface condenser will directly translate into a relatively higher efficiency of a steam turbine on Mars for power generation as compared to that on Earth. Very low atmospheric pressure on Mars also means rapid conversion of water into steam and its explosive expansion, generating not only the power but also pure and distilled water for utilization by the human colony.

Although the invention has been explained in relation to its preferred embodiment, it is to be understood that many other possible modifications and variations can be made without departing from the spirit and scope of the invention as hereinafter claimed.

What is claimed is:

1. A method of hybrid power generation in an environment with a gas pressure below the earth's atmospheric pressure comprising the steps of:
    (A) providing a subsurface water ice deposit, a buffer tank, a water pump, a high-pressure feeder system (HPFS), a low-pressure feeder system (LPFS), a flash tank, a turbine, and a generator, wherein the turbine is torsionally coupled to an input of the generator;
    (B) extracting liquid water from the subsurface water ice deposit into the buffer tank;
    (C) converting a first portion of the liquid water into supercritical water by pumping the first portion of liquid water through the HPFS with the water pump at a first volumetric proportion;
    (D) converting a second portion of the liquid water into superheated water by pumping the second portion of liquid water through the LPFS with the water pump at a second volumetric proportion, wherein a specified volumetric ratio is defined between the first volumetric proportion and the second volumetric proportion;
    (E) producing flash steam by channeling the superheated water from the LPFS into the flash tank;
    (F) producing rotational kinetic energy with the turbine by inputting a mixture of the supercritical water and the flash steam into the turbine; and
    (G) transferring the rotational kinetic energy from the turbine to the generator in order to produce electrical energy with the generator.

2. The method of hybrid power generation in an environment with a gas pressure below the earth's atmospheric pressure as claimed in claim 1 comprising the steps of:
    providing an auxiliary power source, a heater, an injection pump, an injection fluid source, and an extraction well, wherein the auxiliary power source is electrically connected to the heater, and wherein the extraction well traverses into the subsurface water ice deposit;
    producing superheated-supercritical (Sh-Sc) injection fluid by isochorically pumping injection fluid from the injection fluid source through the heater;
    forming a liquid water reservoir within the subsurface water ice deposit by channeling the Sh-Sc injection fluid through the extraction well into the subsurface water ice deposit; and
    pumping liquid water from the liquid water reservoir through the extraction well into the buffer tank in order to extract the liquid water in step (B).

3. The method of hybrid power generation in an environment with a gas pressure below the earth's atmospheric pressure as claimed in claim 2 comprising the step of:

isochorically pumping the injection fluid through the heater at a temperature of approximately 700 degrees C. and a pressure of at least 50 bar.

4. The method of hybrid power generation in an environment with a gas pressure below the earth's atmospheric pressure as claimed in claim 2, wherein the injection fluid is carbon dioxide (CO2).

5. The method of hybrid power generation in an environment with a gas pressure below the earth's atmospheric pressure as claimed in claim 2 comprising the steps of:
   providing a bidirectional turbine within the extraction well, wherein the channeled Sh-Sc injection fluid drives the bidirectional turbine; and
   pumping the liquid water from the liquid water reservoir into the buffer tank with the bidirectional turbine in order to extract the liquid water in step (B).

6. The method of hybrid power generation in an environment with a gas pressure below the earth's atmospheric pressure as claimed in claim 2 comprising the steps of:
   providing a processing unit and a sensor, wherein the processing unit is electronically connected to the sensor, the heater, and the injection pump;
   continually monitoring a reservoir temperature of the liquid water reservoir with the sensor and the processing unit; and
   maintaining the reservoir temperature within a desired temperature range by controlling a thermal flux of the injection fluid into the liquid water reservoir with the processing unit through the heater and the injection pump.

7. The method of hybrid power generation in an environment with a gas pressure below the earth's atmospheric pressure as claimed in claim 1 comprising the steps of:
   providing a heater, wherein the heater is thermally coupled with the HPFS and the LPFS;
   heating the first volumetric proportion of liquid water in the HPFS with the heater at a first specified temperature and a first specified pressure; and
   heating the second volumetric proportion of liquid water in the LPFS with the heater at a second specified temperature and a second specified pressure.

8. The method of hybrid power generation in an environment with a gas pressure below the earth's atmospheric pressure as claimed in claim 7, wherein the first specified temperature is at least 400 degrees C.

9. The method of hybrid power generation in an environment with a gas pressure below the earth's atmospheric pressure as claimed in claim 7, wherein the first specified pressure is at least 220 bar.

10. The method of hybrid power generation in an environment with a gas pressure below the earth's atmospheric pressure as claimed in claim 7, wherein the second specified temperature is approximately 235 degrees C.

11. The method of hybrid power generation in an environment with a gas pressure below the earth's atmospheric pressure as claimed in claim 7, wherein the second specified pressure is approximately 30 bar.

12. The method of hybrid power generation in an environment with a gas pressure below the earth's atmospheric pressure as claimed in claim 1, wherein the specified relative volumetric ratio defines the first volumetric proportion as one eighth the second volumetric proportion.

13. The method of hybrid power generation in an environment with a gas pressure below the earth's atmospheric pressure as claimed in claim 1 comprising the steps of:
   providing a combined injector as an input of the turbine; and
   inputting the mixture of supercritical water and the flash steam into the turbine through the combined injector.

* * * * *